Feb. 28, 1967  YUTAKA KITANO ET AL  3,307,059
LAMINATED YOKES IN ROTARY ELECTRIC MACHINES
Filed Sept. 3, 1963

INVENTORS
Yutaka Kitano
Shoji Isobe

INVENTORS
YUTAKA KITANO
SHOJI ISOBE
BY: Paul M. Craig, Jr.
ATTORNEY

United States Patent Office 3,307,059
Patented Feb. 28, 1967

3,307,059
LAMINATED YOKES IN ROTARY ELECTRIC MACHINES
Yutaka Kitano and Shoji Isobe, Hitachi-shi, Japan, assignors to Hitachi, Ltd., Tokyo, Japan, a corporation of Japan
Filed Sept. 3, 1963, Ser. No. 306,076
Claims priority, application Japan, Sept. 6, 1962, 37/38,012
1 Claim. (Cl. 310—216)

The present invention relates to laminated yokes in rotary electric machines of large sizes, especially alternating current generators, and more specifically to an improvement in the structure of the lamination of iron sheet segments forming the laminating yokes of such large-sized rotary electric machines.

Generally, salient-pole type alternating current generators of low speed and large capacity are provided with yokes of large diameters, and difficulties are often encountered in the manufacture and shipment of such large-sized yokes. It is therefore a common practice to constitute the yokes in such a manner that iron sheets are punched by a trimming die to form so-called iron sheet segments, which are then piled up to form a laminated construction and fastened together by means of reamer bolts for providing unitary assemblies thereof.

However, conventional methods of forming the laminated yoke assemblies have comprised joining together iron sheet segments to form a yoke element of circular shape, piling up a second layer of yoke elements thereon in a manner that the joints between adjacent iron sheet segments of the second layer are circumferentially staggered from those of the first layer by the length equal to the distance between adjacent pole-mounting slots, and stacking subsequent layers in a like manner and again successively staggering the joints by a similar amount equal to the distance between adjacent slots in relation to the segments of said first two layers. Such manner of forming the layers of yoke elements is liable to develop relative slippage between the layers of iron sheet segments, as will be described in detail later, and this will result in the twist or distortion in the laminated yokes with eventual dangerous operation of the machines.

The present invention intends to eliminate such possibility of slippage between the laminated iron sheet segments for the purpose of removing any danger attributable to such cause. Therefore, the primary object of the invention is to provide laminated yokes of a mechanically strong nature by effectively increasing a frictional force which resists relative slippage between adjacent layers of the iron sheet segments.

According to the invention, there is provided a laminated yoke adapted for a rotary electric machine of salient-pole type comprising a plurality of iron sheet segments joined together to form a circular yoke element, a multiplicity of said yoke elements being axially piled up in continuous layer to form a laminated construction, characterized in that the joints formed by the juxtaposition of said iron sheet segments in every layer are successively staggered from those of adjacent layers in the circumferential direction by an amount of at least more than two times the circumferential length of one pole-mounting slot in said segments.

Another object of the invention is to provide a laminated yoke construction of a mechanically strong nature by effectively increasing the frictional force which resists relative slippage between adjacent layers of the iron sheet segments without any additional stress on each iron sheet segment.

There are other objects and particularities of the invention which will become obvious from the following description of the invention with reference to the accompanying drawings, in which.

Figure 2:
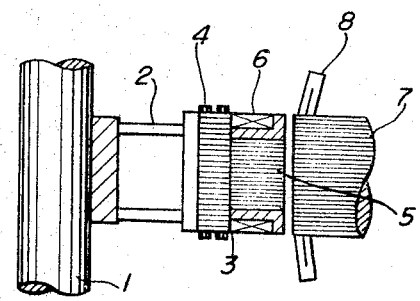
FIG. 2 is a fragmentary side elevational view showing the construction of a large-sized rotary electric machine, with part in longitudinal section.

Now referring to FIG. 2, there is shown a partial view of a large-sized rotary electric machine which comprises a rotor shaft 1 carrying thereon spiders 2 for connection with field cores 5 of salient poles through a laminated yoke 3 of generally annular shape. The laminated yoke 3 is composed of iron sheet segments, as will be described hereinafter, which are integrally fastened together by means of reamer bolts 4. The iron cores 5 carry thereon field coils 6, and a stator core 7 likewise is provided with coils 8 in accordance with the known practice.

Figure 1:
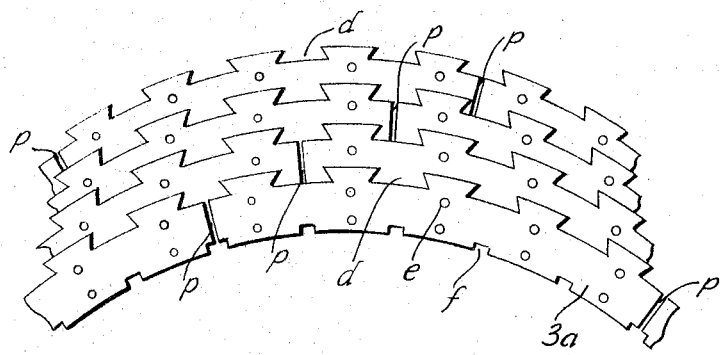
FIG. 1 is a partial explanatory prospective view of a laminated yoke.

FIG. 1 shows unit iron sheet segments of the laminated yoke 3 shown in FIG. 2, which are staggered in accordance with the laminated construction of the instant invention. The unit iron sheet segment 3a is punched out of an iron sheet by the use of a trimming die as known in the art. The iron sheet segment is provided with a plurality, say five in this figure, of dovetail-like slots d on the outer peripheral portion thereof for receiving therein and supporting the iron cores 5 of the magnetic poles. On the inner peripheral portion of the segment, there are disposed a suitable number of grooves f for receiving therein keys which are adapted to fit in grooves formed on the outer peripheral portion of the spider 2 so as to straddle the inner periphery of the segment on the outer periphery of the spider for transmission of rotation to or from the rotor shaft 1. The segment is further provided with a plurality of through-holes e through which the fastening reamer bolts 4 are passed to constitute the annular laminated yoke 3 when such iron sheet segments are stacked into a unitary body.

Segments are joined together to form a yoke element of circular shape and mutually abutting between adjacent segments in a yoke element as shown in FIGURE 1, form spaces P called joints, as well known in the art, and the joints in each layer are staggered in one circumferential direction by the amount equal to the distance between adjacent pole-mounting slots in relation to adjacent layers in accordance with one feature of the invention.

When such annular laminated yoke 3 is rotated in unison with the rotor shaft 1, the laminated yoke 3 is subjected to the action of a centrifugal force, and the respective unit segments thereof tend to be urged radially outwardly. However, the lamination of the iron sheet segments is fastened together by means of the reamer bolts 4, which exert a sufficient fastening force for providing an effective frictional force between the iron sheet segments in adjacent layers. The segments can therefore conjointly keep the form of the annular yoke without dispersing radially outwardly.

Figure 3:
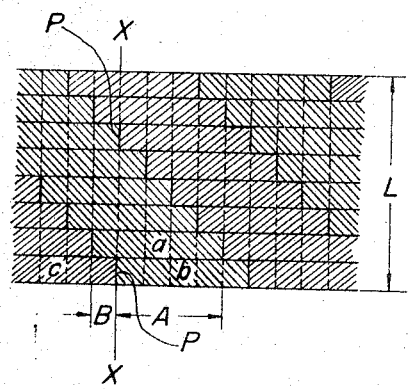
FIG. 3 is a developed explanatory sectional view showing a conventional manner of piling up iron sheet segments of a laminated yoke.

FIG. 3 is a developed explanatory sectional view of a laminated yoke taken along the circumferential direction and shows a conventional manner of piling up the iron sheet segments of the laminated yoke in which each iron sheet segment is assumed to have five slots d for mounting the poles therein as shown in FIG. 1. In FIG. 3, the vertical dotted lines show the position of slots in the segments and the iron sheet segments are piled up in a manner that the joints of the segments in each layer are staggered from those between each adjacent layer in the circumferential direction by one pitch, that is, one arcuate length between pole-mounting slots. It will be seen that, in this case, one joint P will appear at every fifth segment on the same line X—X parallel with respect to the direction of lamination L. In such manner of lamination, consideration is first given to circumferential contact areas between the iron sheet segment $a$ and the segments $b$ and $c$ in the adjacent layer. Then, it will be seen that the contact length between the segments $a$ and $c$ is B which is the length between adjacent pole-mounting slots, and the contact length between the segments $a$ and $b$ is A which is four times as long as the distance B. From the above, it is evident that a frictional force between the iron sheets $a$ and $c$ corresponds to one fourth a frictional force between the iron sheets $a$ and $b$. Since the former frictional force is remarkably small, slippage may be developed between the contact faces of the iron sheets $a$ and $c$.

Supposing now that a force which tends to develop slippage between the iron sheet segments $a$ and $c$ due to the action of a centrifugal force is taken as Q, a fastening pressure exerted between the layers of the iron sheet segments by the reamer bolts is taken as F, a contact area between the iron sheet segments $a$ and $c$ is taken as S, and a coefficient of friction between the laminated layers of iron sheet segments is taken as $\mu$. Then, it will be known that slippage will be developed between the iron sheet segments $a$ and $c$ if the relationship $Q > \mu \cdot S \cdot F$ is satisfied. Same thing can naturally be said for all of the other iron sheet segments in lamination which may have conditions similar to the relationship between the laminated segments $a$ and $c$. Therefore, slippage may be developed between all the layers of iron sheet segments having such relationship. The result will be occurrence of twist or distortion in the laminated yoke and the safety operation of the machine may be endangered.

Figure 5:
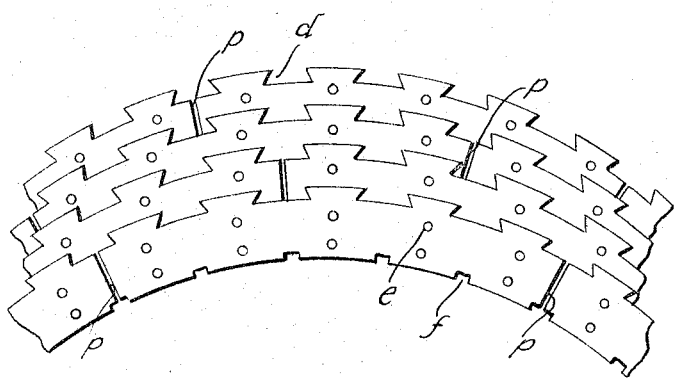
FIGURE 5 is a partial explanatory perspective view of a laminated yoke in accordance with the present invention.
Figure 4:
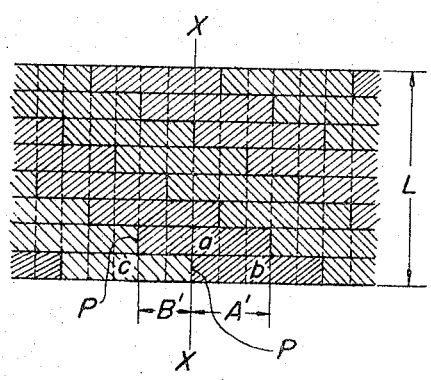
FIG. 4 is a view similar to FIG. 3, but showing a manner of piling up according to the present invention.

The present invention has been devised in an effort to obviate such slippage between the lamination of iron sheet segments to thereby eliminate said danger, and a preferred embodiments of the invention is shown in FIGS. 4 and 5. As known from FIG. 4, the present invention comprises piling up the iron sheet segments in a manner that the joints between the segments in one layer are circumferentially staggered by the length equal to twice the length between pole-mounting slots from the joints of each adjacent layer. In this case, each joint P will appear at every fifth segment on the same line X—X parallel to the direction of lamination L, as in the case of the conventional method of piling-up shown in FIG. 3. Then, a stress charged on each iron sheet segment in sectional direction, for example, at the section X—X will be $5/4=1.25$ times a stress at a section taken at a portion wherein no joint P exists. This is similar for both of FIGS. 3 and 4.

However, as obvious from FIG. 4, the contact length between the iron sheet segments $a$ and $c$ is now B', and the contact length between the segments $a$ and $b$ now takes the value of A'. Thus, the contact length between the segments $a$ and $c$ of FIG. 4 is twice as long as that of FIG. 3, and it is apparent that twice as much resistance can be provided against the slippage between the iron sheet segments $a$ and $c$.

Consideration is further directed to a case wherein one iron sheet segment includes six pole-mounting slots $d$. In this case, one joint will appear at every third segment on the same line perpendicular to the direction of lamination L when the iron sheet segments are piled up in a manner that joints are staggered by the length of two pitches. A stress in the segment at the section X—X will be $3/2=1.5$ times as much as a stress at a section wherein no joint exists. If the iron sheet segments are piled up in a manner that joints are staggered by the length of one pitch, a stress at a section including a joint will be $6/5=1.2$ times as much as a stress at a section without any joint therein. The former is therefore undesirable because of the greater stress exerted on the iron sheet segments, though large resistance against slippage can be obtained.

From the foregoing description, general conclusion will be derived as hereinunder.

Supposing that,

Z=number of pole-mounting slots $d$ in one iron sheet segment;

X=value, expressed in terms of number of pole-mounting slots, of relative displacement of the joints between segments in a layer from those in adjacent layers in one circumferential direction when the iron sheet segments are piled up; and $Y = Z - X$ Then, (1) the value X is preferably as close to value Y as possible in order to minimize the danger due to relative slippage between the iron sheet segments in the lamination; and (2) preferably, the values X and Y are prime relative to each other in order to minimize the stress at a radial section of the yoke comprising the laminated structure of iron sheet segments. It will therefore be understood that Z may preferably be odd numbers in order that the above conditions (1) and (2) are satisfied. It will thus be understood that, in designing the laminated yoke, the number $n$ of iron sheet segments included in one circumference and the number Z of pole-mounting slots included in one iron sheet segment must be suitably selected so as to satisfy the above conditions (1) and (2).

As clearly understood from the general conclusion, the preferable value of X and Y can be easily selected upon assuming a value for Z as follows:

| Z | X | Y |
|---|---|---|
| 5 | 3 | 2 |
| 6 | None | None |
| 7 | 3 | 4 |
| 8 | 3 | 5 |
| 9 | 4 | 5 |
| 10 | 3 | 7 |
| 11 | 5 | 6 |
| 12 | 5 | 7 |
| 13 | 6 | 7 |
| 14 | 5 | 9 |
| 15 | 7 | 8 |

It is clear that we can change X into Y and Y into X.

In case $Z=6$, there is no solution as previously indicated. When $Z=10$, the combination 4 and 6 is not preferable because 4 and 6 are not prime and therefore inevitably result in increasing some stresses on segments in sectional direction. It is similar to the combination 6 and 8 in case $Z=14$.

What is claimed is:

A laminated yoke for a rotary electric machine of salient-pole-type, comprising:

a plurality of iron sheet segments each having a number Z of pole-mounting slots per segment and being abutted to form an annular yoke element thereby forming joints between said segments, a multiplicity of said yoke elements being axially stacked in continuous layers to form a laminated construction, the joints between said iron sheet segments in every layer being successively staggered from the joints in adjacent layers in one circumferential direction to form an overlap by an amount X which is expressed in terms of a number of pole-mounting slots per segment, wherein Z is equal to $X+Y$, Y being any integer, wherein Z is greater than 4, and X is as close in numerical relation to Y as possible and X is prime to Y.

References Cited by the Examiner

UNITED STATES PATENTS

| | | | |
|---|---|---|---|
| 1,817,054 | 8/1931 | Baudry | 310—269 X |
| 1,844,710 | 2/1932 | Wood | 310—269 X |
| 2,994,793 | 8/1961 | Sills | 310—269 X |

FOREIGN PATENTS

| | | |
|---|---|---|
| 1,157,914 | 9/1956 | France. |
| 974,711 | 4/1961 | Germany. |
| 514,213 | 2/1955 | Italy. |

MILTON O. HIRSHFIELD, *Primary Examiner.*

ORIS L. RADER, *Examiner.*

J. J. SWARTZ, *Assistant Examiner.*